(12) United States Patent
Miyazawa (10) Patent No.: US 6,743,486 B1
(45) Date of Patent: Jun. 1, 2004

(54) METHOD FOR PRODUCING SPECTACLE LENS AND LENS PROCESSING SYSTEM

(75) Inventor: Makoto Miyazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/701,634

(22) PCT Filed: Mar. 31, 2000

(86) PCT No.: PCT/JP00/02099
§ 371 (c)(1),
(2), (4) Date: Dec. 1, 2000

(87) PCT Pub. No.: WO00/59679
PCT Pub. Date: Oct. 12, 2000

(30) Foreign Application Priority Data

Apr. 1, 1999 (JP) .................................... 11/095086

(51) Int. Cl.[7] .......................... B24B 9/14; B24B 13/06; G02C 7/02; C08J 7/00
(52) U.S. Cl. .................. 427/596; 427/555; 427/164; 427/256; 351/159; 351/177; 451/43
(58) Field of Search ............................ 427/554, 555, 427/595, 596, 162, 164, 165, 8, 256, 282, 284, 287, 356, 355; 33/200; 351/41, 44, 159, 166, 177; 216/26; 451/42, 43; 359/642

(56) References Cited

U.S. PATENT DOCUMENTS

| | | | | |
|---|---|---|---|---|
| 4,711,035 A | * | 12/1987 | Logan et al. | 33/200 |
| 4,915,986 A | * | 4/1990 | Elias et al. | 427/164 |
| 5,053,971 A | * | 10/1991 | Wood et al. | 364/474.06 |
| 5,960,550 A | * | 10/1999 | Weir et al. | 33/28 |
| 6,159,397 A | * | 12/2000 | Friedman | 264/1.7 |
| 6,242,065 B1 | * | 6/2001 | Blomberg et al. | 351/159 |

FOREIGN PATENT DOCUMENTS

| | | | |
|---|---|---|---|
| JP | 6-191159 | | 7/1994 |
| JP | 06-191159 A | * | 7/1994 |
| JP | 2507643 | | 5/1996 |
| JP | 2507643 Y2 | * | 8/1996 |
| JP | 09-99444 A | * | 4/1997 |
| JP | 10-282459 A | * | 10/1998 |

OTHER PUBLICATIONS

International Search Report.

* cited by examiner

Primary Examiner—Shrive P. Beck
Assistant Examiner—Wesley D Markham
(74) Attorney, Agent, or Firm—Sughrue Mion, PLLC (57) ABSTRACT

Production information such as an edging mark 31 indicating a region of a lens remaining after edging and reference position marks 32 are depicted in a region, to be cut off by the edging, of a surface of a lens 10 for spectacles. Any production information does not remain on the finished lens 10 after the edging. A lens processing system 100 includes a reference position detecting apparatus (120 and 130) for detecting a reference position of a spectacle lens, and a marking apparatus (170, 160, 150 and 110) for depicting production information of the lens on a specific surface of the spectacle lens on the basis of the reference position information obtained by the reference position detecting apparatus (120 and 130).

8 Claims, 5 Drawing Sheets

METHOD FOR PRODUCING SPECTACLE LENS AND LENS PROCESSING SYSTEM

TECHNICAL FIELD

The present invention relates to a method for producing a spectacle lens and a lens processing system, and particularly to a method for producing a spectacle lens, which method is improved in production yield, and a lens processing system used for the production method.

BACKGROUND ART

Spectacles have been fabricated in spectacle shops as follows: namely, circular spectacle lens have been subjected to edge cutting work called "edging" in matching with inner shapes of openings of a spectacle frame selected by a user, and the edged lenses thus obtained have been fitted in the openings of the spectacle frame.

In recent years, however, because of the lack of the number of laborers skilled in works of edging and inserting the edged lenses in spectacle frames and employed in spectacle shops, there have been strong demands for lens makers to process lenses until edging and deliver the edged lenses to retail shops.

On the other hand, plastic lenses having a merit easier to be dyed are superior in fashion and light-shield characteristics to glass lenses, and from this viewpoint, there have been strong demands for dyeing of plastic spectacle lens. In particular, demands for gradation dyeing of a lens have become strong. The gradation dyeing is performed by gradually reducing a dyeing density generally from a densely dyed upper half of a lens to a non-dyed bottom side thereof.

Lenses to be finished until the dyeing work and edging are customized, and in such customization, the number of production steps becomes larger than that of ordinary production steps.

In customization of lenses required to be processed until the dyeing work and edging, recipe information of the lenses is previously supplied from a retail shop. The recipe Information includes not only information on a dioptric power and an astigmatism of each of the lenses, but also spectacle frame information indicating shapes of inner peripheral edges of openings of the spectacle frame required for edging, and dyeing specification information on a color tone of dyeing and on the fact whether or not the dying is gradation dying.

On the lens production side, the recipe information is converted into information required for production of spectacle lens. To be more specific, a work instruction sheet and a work confirmation drawing are printed for each of the lenses. Various work instructions are written on the work instruction sheet. A full-size circular lens closing line and a full-size edging line indicating the contour of an edged lens are written, together with a reference line, on the work confirmation drawing. The work instruction sheet and the work confirmation drawing are shifted from one to another step together with a lens to be processed.

Figure 5:
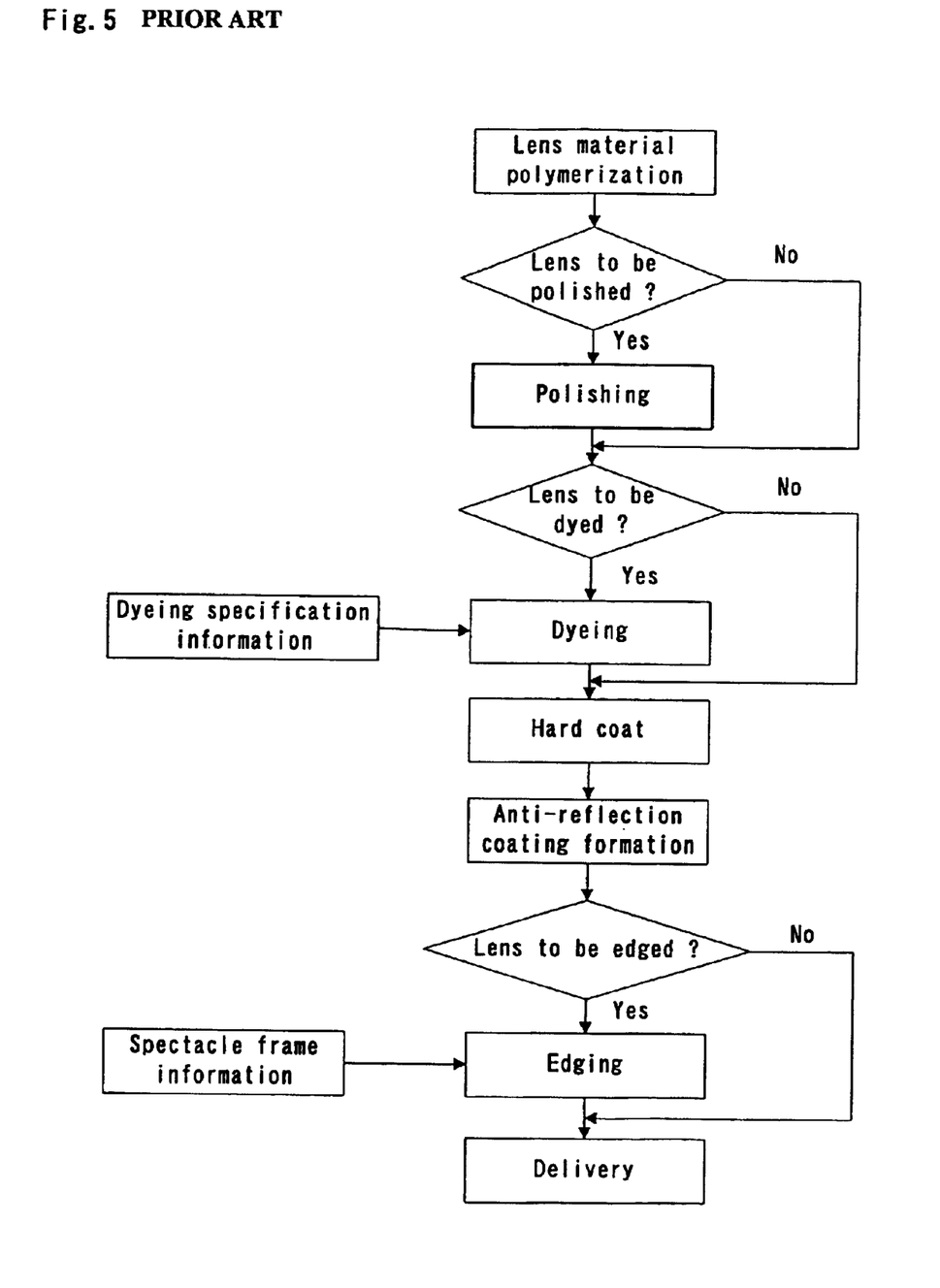
FIG. 5 is a flow chart showing steps of producing a spectacle lens, illustrating a conventional production process.

FIG. 5 shows steps of producing a customized plastic lens required to be finished until the dyeing and edging steps. The process starts with a lens material polymerization step at which a monomer as a lens material is poured in a mold typically a glass mold, followed by polymerization, to obtain each lens having a specific dioptric power. If the lens is of a multi-focal type, concealed marks for determining a fitting point are transferred from the mold onto a surface of the lens thus obtained.

A polishing step includes polishing work for imparting desired optical characteristics to the lens of a kind impossible to be stocked, such as a lens having a dioptric power out of a usual range or a progressive multi-focal lens, and thinning work for making the lens as thin as possible in matching to the shape of a spectacle frame with its dioptric power kept at a specific value. It is dependent on the kind of a spectacle lens whether or not the polishing step should be carried out.

A dyeing step is carried out for coloring the lens into a specific color. It is dependent on the kind of a lens whether or not the dyeing should be carried out. At the dyeing step, which is carried out on the basis of dyeing specification information, a lens is dipped in a solvent in which a dye has been dissolved, whereby the surface of the lens is colored with the dye.

At a hard coat formation step, the lens is dipped in a hard coat solution, followed by drawing up and drying, to form a hard coat having a good abrasion resistance on the surface of the lens.

At anti-reflection coating formation step, a multi-layer film of, typically, inorganic oxide layers are deposited on the lens by vacuum vapor-deposition, to form anti-reflection coating on the lens.

The lens processed until the above-described steps have been taken as a finished product; however, recently, the lens has been often required to be further processed until the edging step. The edging step is carried out by cutting off the outer peripheral edge of the lens into a shape equivalent to a shape of an inner peripheral edge of an opening, in which the lens is to be fitted, of spectacles on the basis of spectacle frame information supplied from a retail shop.

The lens is inspected at each of the above-described steps, followed by final inspection, to be finished. The spectacle lens thus finished is supplied to a retail shop.

With respect to the above-described conventional lens production steps, along with the increased demand for a lens maker to process lenses until the edging, it has been required to review the conventional production steps.

For a lens processed until the anti-reflection coating formation step before the edging step and supplied as a finished product to a retail shop, a desired appearance quality must be guaranteed over the entire lens except for only a region from the outermost periphery to a line positioned inwardly therefrom by about 1 mm. Here, appearance defects of a lens may include the entrapment of foreign matters, polymerization strain, and bubbles at the lens material polymerization step, the entrapment of foreign matters and solution sag at the outer peripheral portion at the hard coat formation step, uneven dyeing at the dyeing step, and partial penetration at the anti-reflection coating formation step. That is to say, these appearance defects must be perfectly eliminated over the entire lens.

For a lens processed until the anti-reflection coating formation work, which lens is to be further subjected to the edging in a lens maker, since a region of the lens outside the shape of a edged lens is to be cut off, the appearance quality in the region is not required to be guaranteed. Even for such a lens, however, the appearance quality has been guaranteed over the entire lens just as the above-described lens not subjected to edging, with a result that the production yield of the lenses of this type has been degraded.

On the other hand, gradation dyeing at the dyeing step is carried out by dipping the upper side of a lens in a dye solution and moving it up and down in the dye solution, to form gradation of dyeing. Accordingly, upon gradation dyeing, it is required to dip a lens in a dye solution in a state in which the vertical direction of the lens is accurately set. To meet this requirement, an operator impresses the principal meridian direction and horizontal direction determined from a concealed mark or an astigmatism axis on the lens by using a diamond pen or the like, and sets the lens such that the impressed position is aligned to a specific position of a dyeing jig. As a result, there occur problems that the dyeing work is complicated, the automation of the dyeing step is obstructed, and an error of dyeing position may occur due to a working mistake or a variation in setting position between operators.

In view of the foregoing, the present invention has been made, and an object of the present invention is to provide a method for producing a spectacle lens, which is capable of carrying out appearance inspection only for a portion required for guarantee of an appearance quality of the lens, and further reducing the dyeing work, allowing automation of dyeing, and enhancing the dyeing accuracy at a dyeing step.

Another object of the present invention is to provide a lens processing system used for the method for producing a spectacle lens.

DISCLOSURE OF INVENTION

As a result of examination to achieve the above object, the present inventor has paid attention on the fact that a spectacle lens is cut off except for a region finally remaining after edging (hereinafter, referred to as "edged lens region"), and found that if information on the shape of a edged lens to be fitted in an opening of a spectacle frame is given, various kinds of production information required for production of the lens can be depicted in the region to be cut off by the edging.

If an edging mark indicating an edged lens region is depicted as production information of a lens, the quality of only a region inside the edging mark may be guaranteed, and accordingly, even if defects are observed in a region outside the edging mark, these defects are negligible. If such an edging mark is not depicted, a region whose quality should be guaranteed is indefinite, and accordingly, the quality of the entire lens must be guaranteed, so that the production yield is degraded because of over-quality. On the other hand, if reference position marks are depicted as production information of a lens before dyeing, mark impressing work for alignment of the lens to a jig for gradation dyeing can be omitted, so that it is possible to automate a dyeing step and to improve the dyeing accuracy.

The production information such as the edging mark and reference position marks depicted on a lens cannot be erased; however, if the production information is depicted on a region of the lens, to be cut off by the edging, the appearance of the finished lens obtained by removing the region is not affected by the production information.

The edging mark may be configured as an edging line slightly larger than and similar to a shape of a peripheral edge of the edged lens. The edging line thus depicted, which can indicate the edged lens region, does not remain in the finished product because it is depicted in the region to be cut off by the edging.

The present inventor has also found that a lens processing system, which has a reference position detecting apparatus for detecting reference positions by typically detecting concealed marks impressed on a lens and a marking apparatus for depicting specific production information at a specific position of the lens on the basis of the reference position information, is effective for depiction of production information such as edging mark on the lens.

BEST MODE FOR CARRYING OUT THE INVENTION

Hereinafter, an embodiment of the present invention will be described below. It should be noted that the present invention is not limited thereto.

A method for producing a spectacle lens according to the present invention has, as described above, a marking step for depicting production information of a spectacle lens in a region, to be cut off by edging, of the surface of the spectacle lens.

The method for producing a spectacle lens can be applied to a single-focal lens, a multi-focal lens, and a progressive multi-focal lens, irrespective of the kind of the lens.

In production of a customized lens required to be processed until edging and dyeing work, recipe information is previously supplied from a retail shop. The recipe information includes not only information on a dioptric power and an astigmatism of the lens, but also spectacle frame information indicating a shape of an inner peripheral edge of an opening, in which the lens is to be fitted, of a spectacle frame, dyeing specification information on a color tone of dyeing and on the fact whether or not the dyeing is gradation dyeing, and information on the fact whether or not thinning work for reducing the thickness of the lens by polishing should be performed. To carry out the method for producing a spectacle lens according to the present invention, it is required to previously receive the above-described spectacle frame information.

Figure 1:
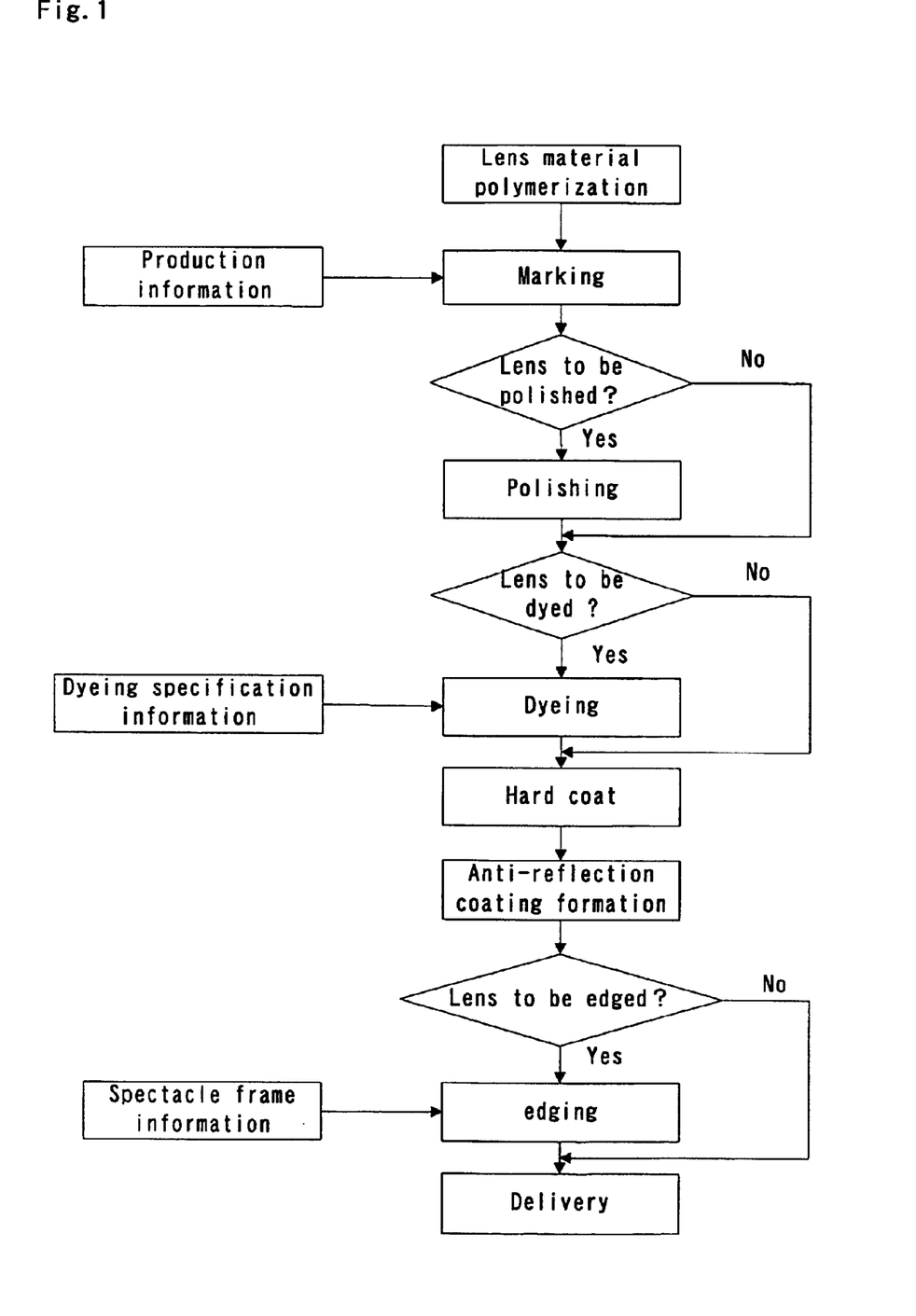
FIG. 1 is a flow chart showing steps of producing a spectacle lens according to the present invention.

The method for producing a spectacle lens according to the present invention, which is carried out on the basis of the above-described recipe information, will be described with reference to a flow chart shown in FIG. 1. It should be noted that the following description is made mainly by example of a multi-focal lens, with the description of the other types of lenses made if needed.

The process starts with a lens material polymerization step at which a monomer as a lens material is poured in a mold typically a glass mold, followed by polymerization, to thus obtain a lens having a specific dioptric power. If the lens is of a multi-focal type, concealed marks for determining a fitting point are transferred from the mold onto the surface of the lens. If the lens is of a single-focal type, any information for determining such a reference position is generally not transferred on the lens.

The process goes on to a marking step at which production information is depicted on the lens obtained at the above-described step. The marking step may be carried out at any stage between the lens material polymerization step and a lens finishing step; however, it may be preferably carried out at an earlier stage, particularly, after the lens material polymerization step.

Figure 2:
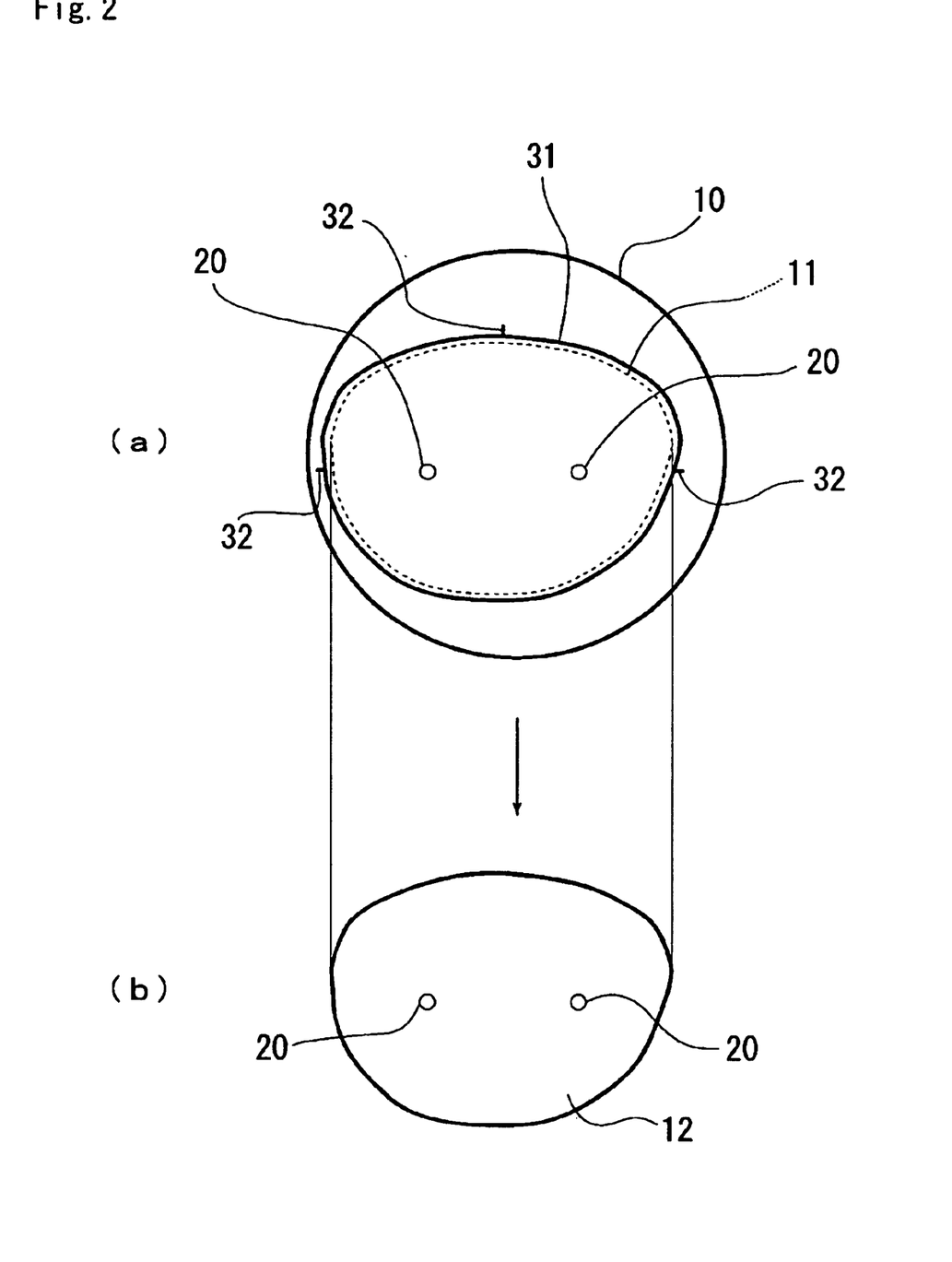
FIG. 2(a) is a plan view showing an example of marking depicted on a lens.
FIG. 2(b) is a plan view showing a shape of a edged lens having been subjected to edging along a broken line 11 shown in FIG. 2(a)

One example of production information depicted at the marking step is shown in FIGS. 2(a) and 2(b). Two concealed marks 20 transferred from the mold at the above-described lens material polymerization step appear inconspicuously on a lens 10 shown in FIG. 2(a). The production information depicted in FIG. 2(a) includes an edging line 31 and three reference position marks 32. As shown in FIG. 2(a), a shape of an inner peripheral edge of an opening of a spectacle frame (equivalent to a shape of an edged lens) is shown by an imaginary broken line 11. The edging line 31 as an edging mark, which is slightly larger than and similar to the shape of the edged lens, is distinctly depicted outside the imaginary broken line 11. The three reference position marks 32 indicating reference positions of the lens 10 in the horizontal and vertical directions are distinctly depicted outside the edging line 31. The reference position marks 32 are used for alignment of the lens 10 to a jig at a gradation dyeing step. While the edging line 31 and the reference position marks 32 are both depicted in FIG. 2(a), only either one of the edging line 31 or the reference position marks 32 may be depicted.

The region surrounded by the broken line 11 is a region (edged lens region) remaining after the edging, and the edging line 31 is provided for indicating the edged lens region. If a line following the shape of the edged lens is depicted, there may occur an inconvenience that the line remains on the finished lens after the edging. To cope with such an inconvenience, the edging line 31 slightly larger than and similar to the shape of the edged lens is depicted in the region, to be cut off by the edging, positioned outside the edged lens region. While the edging line 31 is depicted as the edging mark in FIG. 2(a), the edging mark may be formed by coloring a region outside a line equivalent to the edging line 31. Further, any kind of mark for indicating the shape of the edged lens may be formed insofar as it can clearly indicate the shape of the edged lens.

The position and shape of each of the reference position mark 32 are not limited to those shown in FIG. 2(a). The reference position mark 32 may be depicted as any line or any graphic form insofar as it can be used as a reference for alignment of the lens 10 to the dyeing jig.

The peripheral edge of the lens 10 is cut along the broken line 11 at the edging step into a finished lens 12 shown in FIG. 2(b). With this edging, the edging line 31 and the reference position marks 32 positioned outside the edged lens region 11 are finally removed from the finished lens 12, and therefore, they do not remain on the finished lens 12.

The production information depicted on the lens 10 may include, in addition to the edging line 31 and the reference position marks 32, characters such as a production number of the lens and a delivery due data, or a mark useful for works. Such additional production information can be freely depicted in the region outside the edging mark 31. The marks may be depicted on either the outer surface (objective side) of the lens or the inner surface (eye side) of the lens; however, if the lens is subjected to polishing work, the marks should be depicted on a surface side on which polishing is not carried out.

A lens processing system for depicting the production information such as the edging line 31 and the reference position marks 32 will be described below. To depict the edging line and the reference position marks on a lens, it is required to detect a lens reference position having been already marked on the surface of the lens. For a lens having a directivity such as a multi-focal lens or an astigmatism correction lens, two or more reference positions, or one reference position and one reference direction are detected. The lens reference position can be obtained by detecting concealed marks impressed on a lens by using a CCD camera and image analyzing software, and determining a fitting point and the concealed marks as the lens reference position. If the accuracy of an outside diameter of a lens with respect to a geometrical center of the lens satisfies an allowable value, the lens reference position can be detected on the basis of the outside diameter of the lens. In each case the lens reference position, for example, the geometrical center of the lens is determined by various kinds of position detecting means. For a single-focal lens for correcting an astigmatism, it is required to measure an astigmatism axis by using a lens meter for measuring the dioptric power of the lens and to determine the vertical and horizontal directions of the lens on the basis of the astigmatism axis.

The shape of an inner peripheral edge of an opening of a spectacle frame, which is required to depict the edging line, is determined by receiving shape data regarding the shape of the peripheral edge required for the edging from a retail shop or a data base concerning shapes of spectacle frames, and calculating the shape of the edging line on the basis of the shape data by using a computer. The shape data can be obtained from a spectacle frame by, for example, using a peripheral shape determining function of a commercially available edged lens preparation machine.

On the basis of the shape of the edging line thus obtained and the lens reference position thus determined, processing data required to depict the edging line and reference position marks on the lens are obtained. The marking apparatus may be controlled on the basis of the processing data thus obtained.

In addition, since the lens surface is not flat but curved, a distance between the lens surface and the marking apparatus may be desirable to be kept at a specific value by three-dimensionally positioning the lens by using a positioning apparatus capable of three-dimensionally holding the lens while controlling the marking apparatus.

Examples of the marking means may include a laser type such as a carbon dioxide laser, an excimer laser, or a YAG laser; an air pen type; a diamond pen type; a water jet type; a sand blast type; and a printing type such as an ink jet type. The marks applied in the present invention need not necessarily be the concealed marks, but it is rather preferable that the marks should be depicted clearly.

Figure 3:
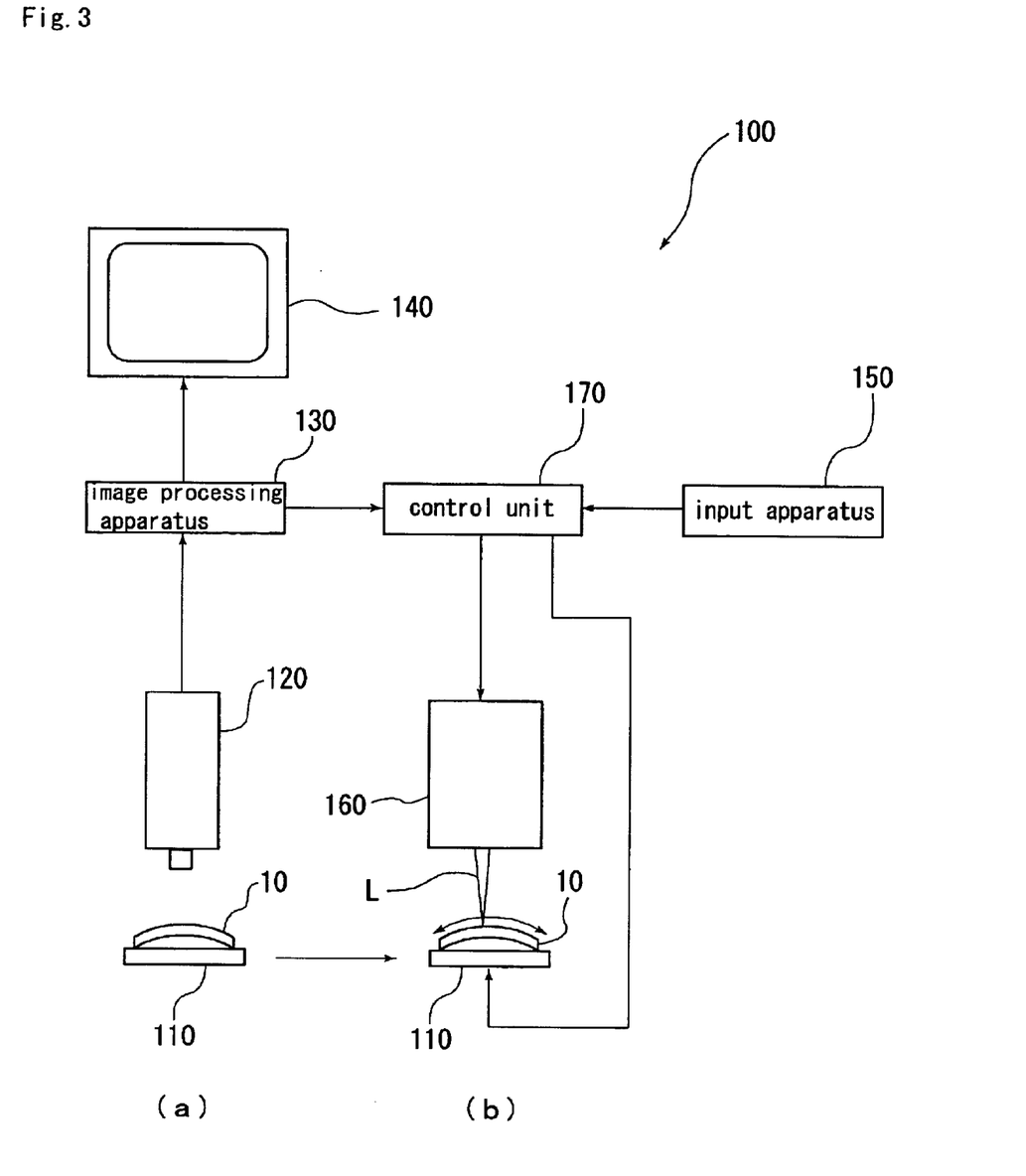
FIG. 3 is a block diagram showing one embodiment of a lens processing system of the present invention.

FIG. 3 shows a block diagram showing one embodiment of the lens processing system for depicting marks on a lens by using a laser beam. A lens processing system 100 is comprised of a reference position detecting apparatus and a marking apparatus. The reference position detecting apparatus includes a CCD camera 120 for photographing a lens 10 supported by a positioning apparatus 110 and disposed on an image pick-up stage (a); an image processing apparatus 130 for analyzing an image signal obtained by the CCD camera 120 and determining a lens reference position on the basis of positions of concealed marks of the lens 10 or the like impressed on the lens 10; and a monitor 140 for displaying an image recognized by the image processing apparatus 130. The marking apparatus includes an input apparatus 150 such as a key board; a laser irradiation apparatus 160, including a laser oscillator (not shown), for irradiating a specific position of the lens 10 disposed on the processing stage (b) with a laser beam emitted from the laser oscillator; a control unit 170 for controlling the laser irradiation apparatus 160 and the positioning apparatus 110 on the basis of the data of lens reference position analyzed by the image processing apparatus 130, information inputted from the input apparatus 150 or the like, and information from a data base (not shown); and the above-described positioning apparatus 110.

The positioning apparatus 110, which is capable of three-dimensionally moving the posture of the lens 10, is controlled by the control unit 170 to adjust a three-dimensional relative positional relationship between the laser irradiation apparatus 160 and the lens surface for usually matching a focal position of a laser beam L to the lens surface, and to be moved for matching a marking position to the laser beam L.

The operation of the lens marking apparatus will be described below. The CCD camera 120 photographs each of the lenses 10 intermittently carried to the image pick-up stage (a) by the positioning apparatus 110. An image signal photographed by the CCD camera 120 is inputted in the image processing apparatus 130. The image processing apparatus 130 determines, from positions of two concealed marks impressed on the lens 10, a fitting point at the center between the two concealed marks, or determines the geometrical center of the lens from the outside diameter of the lens, to analyze a lens reference position. The lens reference position analyzed by the image processing apparatus 130 is inputted in the control unit 170. The control unit 170 selects shape data of a edged lens from a data base on the basis of a signal inputted from the input apparatus 150, or directly receives the shape data of the edged lens from the input apparatus 150; calculates coordinates of a shape of an edging line and shapes of reference position marks required for gradation dyeing on the basis of the lens reference position obtained by the image processing apparatus 130, to prepare processing data required for marking; and controls the laser irradiation apparatus 170 and the positioning apparatus 110 on the basis of the processing data. The laser irradiation apparatus 160 Is controlled by the control unit 170 to irradiate each of the lenses 10 intermittently carried to the processing stage (b) with the laser beam L. The positioning apparatus 110 is controlled by the control unit 170 to three-dimensionally drive the lens 10 and to be three-dimensionally moved for depicting a mark at a specific position of the lens with the laser beam L. In this way, the edging line 31 and reference position marks 32 are depicted on the lens 10 as shown in FIG. 2(a).

While the lens marking apparatus shown in FIG. 3 is configured such that the image pick-up stage is separated from the processing stage, it may be configured such that the marking can be performed on the same stage as that for detection of the lens reference position by making the CCD camera coaxial with the laser irradiation apparatus. Further, the lens marking apparatus may be configured such that the marking can be performed in a state in which the lens on the processing stage is fixed by scanning the laser beam emitted from the laser irradiation apparatus, and making variable the focus of the laser irradiation apparatus or three-dimensionally moving the laser irradiation apparatus.

Referring again to the flow chart of FIG. 1, steps of finishing the lens 10, on which the edging line 31 as the edging mark and the reference position marks 32 have been depicted as shown in FIG. 2(a), will be described.

A polishing step includes polishing work for imparting desired optical characteristics to a lens impossible to be stocked, such as a lens having a dioptric power out of a usual range or a progressive multi-focal lens, and also includes thinning work for polishing a thick semi-finished lens in such a manner as to make the lens as thin as possible in matching to the shape of a spectacle frame with its dioptric power kept at a specific value, thereby obtaining a lens whose diameter is smaller than the original lens. The thinning work is special work performed not only for a multi-focal lens but also for a single-focal lens. It is dependent on the kind of a spectacle lens whether or not the polishing step should be carried out.

The polishing step includes a sub-step called blocking for holding a semi-finished lens on a processing device, a sub-step for fixing the semi-finished lens on the processing device taken as the processing reference at the polishing step, a sub-step for grinding or cutting the lens so as to shape the lens, a sub-step for making fine the surface roughness of the lens so as to adjust the shape accuracy and improving the surface roughness, and a sub-step for mirror-surface polishing. At the polishing step, the lens may become lacking in thickness due to a processing error in the thickness direction of the lens at each sub-step, for example, a variation in deformation of the lens at the sub-step for blocking, over-grinding or cutting at the sub-step for shaping, or over-polishing at the sub-step for polishing.

According to the conventional method, the lens shape is controlled only by the thickness of the lens at each sub-step of the polishing step, so that when the lens processed until the anti-reflection coating formation step is subjected to the final edging, there may occur a problem that the shape of the edged lens thus obtained is lack partially in a specific peripheral shape. This means that a defective lens has been uselessly processed at the subsequent steps. On the contrary, the lens may be regarded as a defective product because of the lack of thickness due to over-polishing at the polishing step, although the lens can be formed into a specific peripheral shape at the final edging step.

According to the present invention, since the edging line 31 is depicted on the lens 10 as shown in FIG. 2(a), if the lens is over-polished at the polishing step, it can be easily decided whether or not the lens can be formed into a specific peripheral shape at the final edging step, by visually observing whether or not the edging line 31 is partially lacking. As a result, it is possible to solve the conventional problem that a defective product is uselessly subjected to the subsequent steps, and also to relieve the lens regarded as a defective product because of the lack of thickness at the polishing step and hence to improve the production yield.

A dyeing step is carried out for coloring the lens into a specific color. It is dependent on the kind of a lens whether or not the dyeing should be carried out. At the dyeing step, which is carried out on the basis of dyeing specification information, a lens is dipped in a solvent in which a dye has been dissolved, whereby the surface of the lens is colored with the dye.

Gradation dyeing at the dyeing step is carried out by dipping the upper side of a lens in a dye solution and moving it up and down in the dye solution, to form gradation of dyeing. Accordingly, upon gradation dyeing, it is required to dip a lens in a dye solution in a state in which the vertical direction of the lens is accurately set. Even for a single-focal lens, if the lens is of an astigmatism correction type, since such a lens has a directivity, the vertical direction of the lens is required to be accurately set.

According to the conventional method, an operator impresses the principal meridian direction and horizontal direction determined from a concealed mark or an astigmatism axis on the lens by using a diamond pen or the like, and sets the lens such that the impressed position is aligned to a specific position of a dyeing jig. As a result, there occur problems that the dyeing work is complicated, and an error of dyeing position may occur due to a working mistake or a variation in setting position between operators.

According to the present invention, the reference position marks 32 shown in FIG. 2(a) are depicted on the lens 10 before the lens 10 is shifted to the dyeing step, and accordingly, since it is possible to eliminate the need for an operator to impress a reference position for dyeing on the lens 10 and hence to improve the productivity, and also to reduce a variation in dyeing position. Further, since the positioning of the lens for gradation dyeing at the dyeing step can be automated by inputting a signal obtained by photographing the reference position marks 32 depicted on the inner surface or outer surface of the lens 10 in the image processing apparatus, it is possible to reduce the number of steps and to eliminate a working mistake and a variation in setting position of the lens between operators.

At a hard coat formation step, the lens is dipped in a hard coat solution, followed by drawing up and drying, to form a hard coat having a good abrasion resistance on the surface of the lens.

At anti-reflection coating formation step, a multi-layer film of, typically, inorganic oxide layers are deposited on the lens by vacuum vapor-deposition, to form anti-reflection coating on the lens.

At the final edging step, the lens is cut into the shape of an edged lens indicated by the broken line 11 shown in FIG. 2(a). With this edging, the edging line 31 and reference position marks 32 are removed from the finished lens 12 as shown in FIG. 2(b), that is, they do not remain on the finished lens 12.

In addition, the edging may be carried out in a spectacle shop, and in this case, the work is not carried out on the lens maker side, and the lens on which the edging line 31 and the reference position marks 32 remain as depicted is delivered to the spectacle shop.

At each of the above-described steps, various appearance defects occur. The appearance defects may include the entrapment of foreign matters, polymerization strain, and bubbles at the lens material polymerization step, damages at the polishing step, the entrapment of foreign matters and solution sag at the outer peripheral portion at the hard coat formation step, uneven dyeing at the dyeing step, and partial penetration at the anti-reflection coating formation step.

According to the conventional method, since a region whose quality should be guaranteed is indefinite, the quality of the entire lens must be guaranteed, and accordingly, the production yield is degraded because of over-quality. Further, since an operator visually observes the lens placed on the work confirmation drawing carried together with the lens and decides whether the lens is a non-defective product or a defective product, there occurs a large variation in the decided accuracy between operators.

According to the present invention, since the edging line 31 as the edging mark shown in FIG. 2(a), which is depicted on the lens, functions as a boundary line for appearance inspection, the quality of only the region inside the edging line 31 may be guaranteed, and even if defects are observed in a region outside the edging mark, these defects are negligible. Accordingly, since the appearance quality may be guaranteed only for the region surrounded by the edging line 31, it is possible to significantly reduce a variation in decided accuracy, and to relieve a lens have been regarded as a defective product and hence to significantly improve the production yield. Since it is not required to guarantee the appearance quality of the entire surface of a lens, a region whose appearance is to be inspected becomes narrower, with a result that it is possible to reduce the manpower and time for inspection and hence to reduce the lens production cost. Further, since a signal, which is obtained by photographing the edging line 31 depicted on the inner surface or outer surface of a lens and is inputted in the image processing apparatus, can be used as a boundary condition for determining a region whose appearance is to be inspected, it is possible to easily automate the appearance inspection.

Additionally, since it is not required to carry the conventional work confirmation drawing together with a lens, it is possible to easily automate the lens production process.

EXAMPLE 1

A progressive multi-focal lens used in this example has a specification that the lens is to be finished until edging, with gradation dyeing work and no polishing work.

Figure 4:
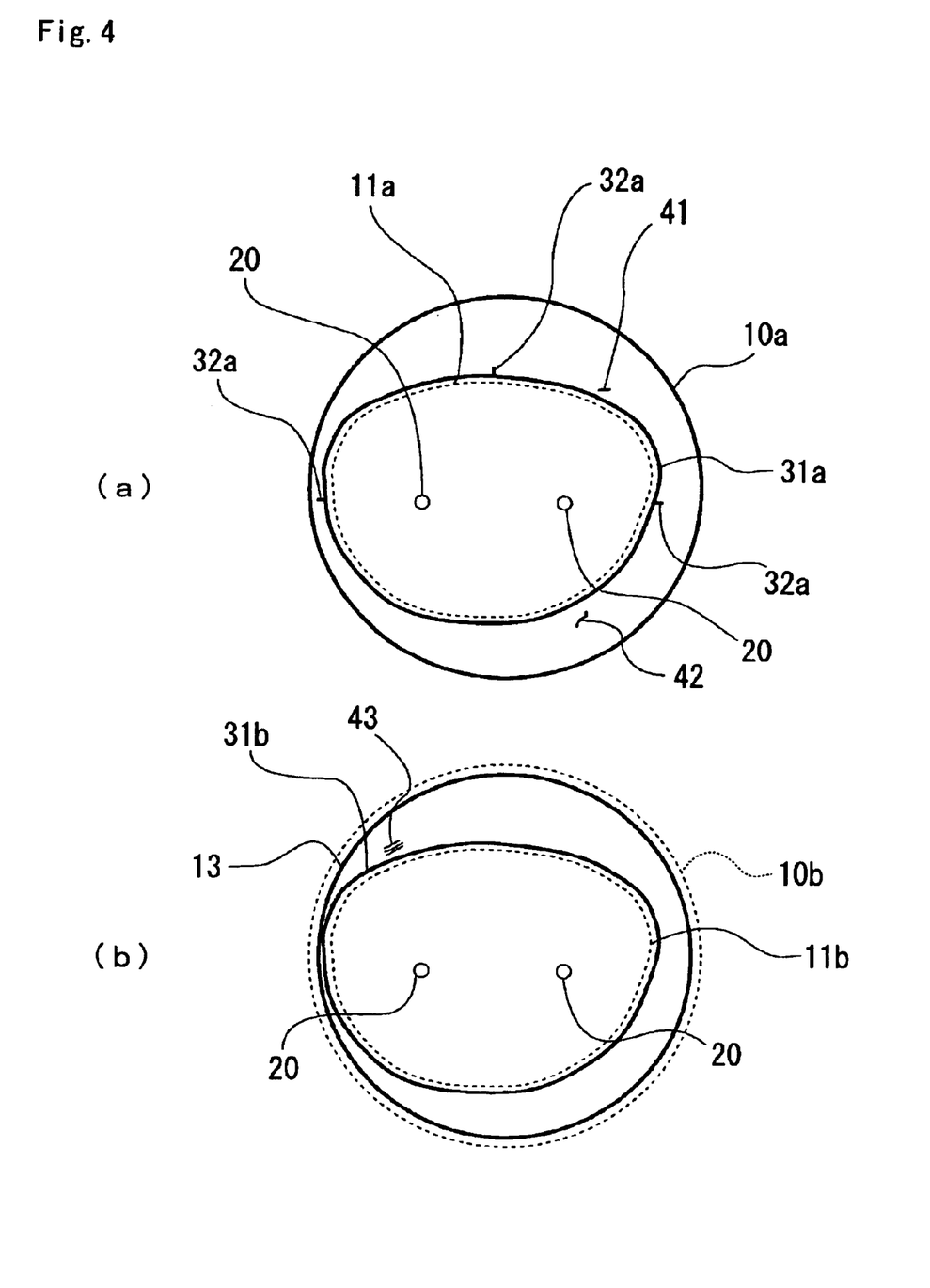
FIG. 4(a) is a plan view showing a lens produced in Example 1.
FIG. 4(b) is a plan view showing a lens produced in Example 2.

As shown in FIG. 4(a), a reference position of a progressive multi-focal lens 10a was determined, on the basis of concealed marks 20 impressed on the lens 10a for determining a fitting point, by using the lens processing system shown in FIG. 3. On the basis of the lens reference position thus determined, an edging line 31a as an edging mark and reference position marks 32a for dyeing were depicted on the outer surface (objective side) of the lens 10a by a carbon dioxide laser.

The reference position marks 32a for dying, depicted on the progressive multi-focal lens 10a, were detected by a reference position detecting means of an automatic dyeing apparatus, followed by gradation dyeing of the lens 10a.

The lens 10a was then subjected to hard coat formation work. At this time, two appearance defects 41 and 42 due to entrapment of foreign matters were found outside the edging line 31a as shown in FIG. 4(a); however, the lens 10a was taken as a non-defective product because these defects 41 and 42 were located outside the shape of the final edged lens. The lens 10a was carried to the subsequent anti-reflection coating formation step, at which anti-reflection coating was formed on the lens 10a.

The lens was carried to dimension and appearance inspection steps, at which the dimension and appearance of the lens were inspected. As a result, the lens was decided as a non-defective product in terms of both the dimension and appearance. The lens was then finally subjected to edging.

After the edging work, since the lens was formed into the shape of a edged lens shown by a broken line 11a, the edging line 31a and reference position marks 32a for dyeing were all cut off, and accordingly, the edged lens thus obtained had no appearance defect.

As described above, the partial appearance defects were found at the hard coat formation step of the lens production process. According to the conventional method, the lens having these defects is possibly regarded as a defective product at the hard coat formation step because the peripheral edge shape of the edged lens is unclear. According to the present invention, however, since the positions at which the appearance defects were found were located outside the edging line 31a, the lens could be regarded as a non-defective product and carried to the edging step.

The lens in this example has a specification of gradation dyeing; however, if the lens has a specification of full-dyeing or no dyeing, the formation of the reference positions for dyeing may be omitted. In this case, the same effect can be obtained by carrying out the other steps in the same manner as that described above.

EXAMPLE 2

A progressive multi-focal lens made from a plastic material in this example has a specification in which the lens is colorless and is to be subjected to thinning work and edging.

A fitting point as a lens reference position was determined from concealed marks 20 depicted on the outer surface (objective side) of a lens 10b by using the lens processing system shown in FIG. 3. On the basis of the lens reference position, an edging line 31b shown in FIG. 4(b) was depicted by using a carbon dioxide laser as a marking means. Processing data for depicting reference position marks for dyeing were not required to be prepared because the progressive multi-focal lens in this example was specified to be colorless.

At a polishing step, the progressive multi-focal lens was formed into a specific positional accuracy, whereby a lens having an outside diameter 13 smaller than that of the original lens 10b was obtained. The lens was then polished to have a desired polishing appearance. At this polishing step, a deep polishing damage 43 was formed at an outer peripheral portion of the lens.

However, since the polishing damage 43 was located outside the edging line 31b as shown in FIG. 4(b), the lens could be taken as a non-detective product. Since a finished thickness of the lens after polishing was a lower limit of a tolerance, there was a possibility that the lens could not be formed into a specific peripheral edge shape. However, the edging line 31b was located inside the outermost periphery 13 of the lens, the lens could be taken as a non-defective product. The lens was then carried to the subsequent steps, to obtain a finished lens.

The finished lens was finally subjected to edging work. After the edging work, the edging line 31b was all cut off as shown by a broken line 11b of FIG. 4(b), and accordingly, an edged lens to be fitted in an opening of a spectacle frame had no appearance defect.

According to the conventional method, the peripheral shape of a edged lens is unclear, or if the peripheral shape of the edged lens is clear, since an operator visually observes a lens placed on a work confirmation drawing carried together with the lens and decides whether the lens is a non-defective product or a defective product, there occurs a large variation in the decided accuracy between operators. As a result, there is a possibility that a non-defective lens is erroneously regarded as a defective product. On the contrary, according to the present invention, since it can be easily decided that a position at which an appearance defect occurs is located outside the edging line 31b, the above non-defective lens, which has been erroneously regarded as a defective product according to the conventional method, can be regarded as a non-defective product, and can be carried to the edging step.

As described above, since the method for producing a spectacle lens according to the present invention includes a marking step of depicting production information such as a edging mark indicating a edged lens region and reference position marks in a region, to be cut off by edging, of the surface of the lens, it is possible to improve the production yield of lenses and enhance the productivity thereof.

The lens processing system according to the present invention can depict the above production information on a lens.

INDUSTRIAL APPLICABILITY

The method for producing a spectacle lens according to the present invention having usability in improving the production yield of lenses and enhancing the productivity thereof.

The lens processing system according to the present invention can be used for an application in which marks are depicted on a spectacle lens in the above production method.

What is claimed is:

1. A method for producing a spectacle lens, comprising:
   an obtaining step of receiving spectacle frame information,
   a step of forming the spectacle lens;
   a marking step of depicting production information of the spectacle lens including an edging mark, which indicates a first region of the lens remaining after an edging matched with an inner peripheral edge of openings of the spectacle frame and is positioned outside the first region of a surface of the spectacle lens in a second region to be cut off by the edging, of a surface of the spectacle lens, on the basis of the spectacle frame information after the step of forming the spectacle lens;
   after the marking step, at least one step selected from the group consisting of a polishing step, a dyeing step, a hard coat formation step and an anti-reflection coating formation step, after which the edging mark remains on the spectacle lens; and
   an edging step of cutting the spectacle lens into the shape of the inner peripheral edge of openings of the spectacle frame to remove the second region.

2. A method for producing a spectacle lens according to claim 1, wherein said production information of the spectacle lens includes an edging line indicating the first region of the lens remaining after said edging.

3. A method for producing a spectacle lens according to claim 1, wherein said edging mark is an edging line.

4. A method for producing a spectacle lens according to claim 3, wherein said edging line is about 1 mm larger than and the same shape as the inner peripheral edge of an opening of the spectacle frame.

5. A method for producing a spectacle lens according to claim 1, wherein said production information of the spectacle lens includes reference position marks indicating the vertical direction of the spectacle lens.

6. A method for producing a spectacle lens according to claim 1, wherein said edging mark is depicted by irradiating the spectacle lens with a laser beam.

7. The method for producing a spectacle lens according to claim 1, wherein the dyeing step is a gradation dyeing step.

8. A method for producing a spectacle lens according to claim 1, further comprising an appearance inspection step of inspecting only the first region of the spectacle lens, wherein the appearance inspection step is performed prior to the edging step.

* * * * *